United States Patent [19]

Ito et al.

[11] 3,846,390

[45] Nov. 5, 1974

[54] PROCESS FOR PRODUCING POLYVINYL CHLORIDE IN THE PRESENCE OF ALKYL THIOGLYCOLATE AS A CHAIN TRANSFER AGENT

[75] Inventors: Ikoh Ito; Shojiro Ito; Tomoyuki Emura, all of Niihama, Japan

[73] Assignee: Sumitomo Chemical Company, Limited, Osaka, Japan

[22] Filed: Mar. 23, 1972

[21] Appl. No.: 237,502

[30] Foreign Application Priority Data
Mar. 24, 1971   Japan.............................. 46-17459

[52] U.S. Cl............ 260/86.3, 260/87.1, 260/87.5 c, 260/87.5 G, 260/87.7, 260/92.8 W, 260/92.8 R
[51] Int. Cl....... C08f 3/30, C08f 15/06, C08f 15/08
[58] Field of Search.... 260/85.5 N, 92.8 R, 92.8 W, 260/87.5, 86.3, 87.1, 87.7

[56] References Cited

UNITED STATES PATENTS

| | | | |
|---|---|---|---|
| 2,635,090 | 4/1953 | Basdekis | 260/85.5 N |
| 2,740,773 | 4/1956 | Ham | 260/85.5 N |

OTHER PUBLICATIONS

Thinius et al., Chem. ABS 65 (1966) pp. 7279h.

*Primary Examiner*—Harry Wong, Jr.
*Attorney, Agent, or Firm*—Wenderoth, Lind & Ponack

[57] ABSTRACT

When vinyl chloride or a monomeric mixture of vinyl chloride and an other ethylenically unsaturated monomer copolymerizable therewith is subjected to polymerization in the presence of a alkyl thioglycolate, vinyl chloride polymers with properly low average degree of polymerization suitable with a processing can be obtained.

4 Claims, No Drawings

PROCESS FOR PRODUCING POLYVINYL CHLORIDE IN THE PRESENCE OF ALKYL THIOGLYCOLATE AS A CHAIN TRANSFER AGENT

This invention relates to a process for producing vinyl chloride polymers, particularly to a process for producing a vinyl chloride polymer wherein the average degree of polymerization of the resulting vinyl chloride polymer is efficiently decreased.

More especially the present invention relates to a process for producing vinyl chloride polymers with a properly low average degree of polymerization suitable for processing, by polymerizing vinyl chloride or a monomeric mixture comprising vinyl chloride and an other ethylenically unsaturated monomer copolymerizable therewith in the presence of alkyl thioglycolates.

The processability of a vinyl chloride polymer depends greatly on its average degree of polymerization. As a method for improving such processability it is known to reduce the average degree of polymerization of a vinyl chloride polymer by carrying out the polymerization in the presence of a compound having a so-called chain transfer effect, such as an organic mercaptan or hydrocarbon halide. However, when such chain transfer agent is used there are encountered with the following difficulties:

1. The chain transfer effect is low so that it is necessary to use a large amount of the chain transfer agent.
2. The polymerization retarding effect is high so that a large amount of a polymerizing catalyst is required.
3. The chain transfer agent will remain in the polymer to increase the content of a volatile matter in the polymer and impair the thermostability of the polymer.

Therefore it is a principal object of this invention to provide a method for producing a vinyl chloride polymer having a desired low average degree of polymerization without such disadvantages encountered in conventional method.

Other object of this invention is to provide a method for polymerizing vinyl chloride or a monomeric mixture consisting predominantly of vinyl chloride in the presence of a novel chain transfer agent to produce a vinyl chloride polymer having a desired low average degree of polymerization without such drawbacks seen in the use of conventional chain transfer agents.

Other object of this invention will become apparent from the following description.

We have now found that, in the production of vinyl chloride polymers, a certain alkyl thioglycolate has an excellent chain transfer effect and can perfectly or substantially eliminate the above mentioned difficulties seen in the use of conventional chain transfer agents.

Thus the present invention is to provide a process for producing vinyl chloride polymers which comprises polymerizing vinyl chloride or a monomeric mixture comprising vinyl chloride with an other ethylenically unsaturated monomer copolymerizable therewith in the presence of 0.01 to 2 parts by weight of alkyl thioglycolates represented by the general formula:

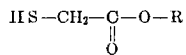

wherein R represents an alkyl group having 2 to 18 carbon atoms, per 100 parts by weight of the total monomer.

The monomers to be used in the present invention are vinyl chloride and a monomeric mixture comprising at least 80 percent by weight of vinylchloride and at most 20 percent by weight of an other ethylenically unsaturated monomer copolymerizable therewith.

The alkyl thioglycolate represented by the above general formula and to be used as chain transfer agent in the present invention is, for example, n-butyl thioglycolate, n-hexyl thioglycolate, n-octyl thioglycolate, 2-ethylhexyl thioglycolate or n-dodecyl thioglycolate. These may be used alone or a mixture of two or more of them. Among them an alkyl thioglycolate having an alkyl group consisting of 4 to 12 carbon atoms is preferable.

If the alkyl group in the above alkyl ester has only one carbon atom, the ester will be water-soluble and therefore the chain transfer effect will be low, while if the alkyl group has more than 18 carbon atoms, the chain transfer effect of the ester will be low with the above mentioned amount.

The alkyl thioglycolate is used generally in an amount of 0.01 to 2.0 parts by weight per 100 parts by weight of vinyl chloride or a monomeric mixture comprising vinyl chloride and an other ethylenically unsaturated monomer copolymerizable therewith. When the amount of the said thioglycolate is less than 0.01 part by weight, the chain transfer effect will become slight, while if it exceeds 2.0 parts by weight, the polymerization will be retarded.

The alkyl thioglycolate may be added all at first or may be added divisionally or continuously in the course of the polymerization reaction.

The process of the present invention may be applicable to any of known polymerization processes in an aqueous medium, such as suspension polymerization process and emulsion polymerization process.

In these polymerization processes a suspending agent such as, for example, starch, gelation, partly saponified polyvinyl alcohol, alkyl cellulose or hydroxyalkyl cellulose may be used, as for emulsifying agent, there may be used sodium alkylsulfate or sodium alkylallylsulfonate. The catalyst to be used may be selected from those well known in the art, such as, for example, oil-soluble catalysts such as benzoyl peroxide, lauroyl peroxide, diisopropyl peroxydicarbonate or azobisisobutylonitrile or water-soluble catalysts such as hydrogen peroxide, potassium persulfate or ammonium persulfate or a redox system of the above with, for example, an iron salt or sulfate.

The polymerization is carried out generally at a temperature of 50° to 70°C.

The ethylenically unsaturated monomer copolymerizable with vinyl chloride which may be used in the present invention is, for example, fatty acid vinyl esters, alkyl vinyl ethers, acrylic esters, methacrylic esters, vinylidene chloride or styrene derivatives.

According to the process of the present invention in which such alkyl thioglycolate as described above is used as a chain transfer agent, there are obtained following remarkable advantages as compared with those cases where conventional chain transfer agents are used:

1. The chain transfer effect is high so that the object can be attained with a small amount of addition thereof.
2. The amount of use of the chain transfer agent may be small so that the delay of the polymerization is little and therefore the time required for the polymerization can be reduced.

3. The amount of use of the chain transfer agent may be small so that the thermostability of the resulting polymer is high.

The invention will be explained by referring to the following Examples which are given for the illustration purpose only and not for limiting the scope of the invention in any way. In these Examples, all parts are by weight. The various measured values indicated in these Examples were determined as follows:

1. Average degree of polymerization:
   Measured according to JIS-K-6721.
2. Volatile contents:
   Measured according to JIS-K-6721.
3. Porosity (c.c./g.):
   Total volume of pores of a radium larger than 75000 A measured with a mercury pressed-in type porosimeter.

EXAMPLE 1

A mixture of 1,800 parts of ion exchanged water, 1.8 parts of a partly saponified polyvinyl alcohol of a saponification degree of 79.8 percent, 1.8 parts of lauroyl peroxide, 1,200 parts of a vinyl chloride monomer and 2.4 parts of 2-ethylhexyl thioglycolate as a chain transfer agent was charged into a glass-lined autoclave provided with an agitator. The mixture was subjected to polymerization at 64°C. for 12 hours.

For comparison, the same procedure was repeated except that carbon tetrachloride, trichlorethylene and n-dodecylmercaptan were used as chain transfer agents.

The average degree of polymerization of the polymers obtained by the above processes are shown in Table 1.

Table 1

| Chain transfer agent | Average degree of polymerization |
|---|---|
| None | 810 |
| 2-ethylhexyl thioglycolate | 650 |
| Carbon tetrachloride | 780 |
| Trichlorethylene | 760 |
| n-dodecylmercaptan | 680 |

It will be understood from Table 1 that an alkyl thioglycolate of the present invention is higher in the chain transfer effect than the known chain transfer agents.

EXAMPLE 2

A mixture of 1,800 parts of ion exchange water, 1.8 parts of a partly saponified polyvinyl alcohol of a saponification degree of 79.8 percent, 0.24 part of lauroyl peroxide, 0.15 part of diisopropyl peroxydicarbonate, 1,200 parts of a vinyl chloride monomer and 1.2 parts of butyl thioglycolate as a chain transfer agent was charged into a glass-lined autoclave provided with an agitator and the mixture was polymerized at 64°C. for 13 hours.

Further, for a control, the same polymerization procedure was repeated except that the polymerizing temperature was made 68°C. without using the chain transfer agent.

The average degree of polymerization, volatile parts and porosities of the polymers obtained by the above processes are shown in Table 2.

Table 2

| | Product of the present invention | Control |
|---|---|---|
| Average degree of polymerization | 702 | 700 |
| Volatile content (%) | 0.14 | 0.49 |
| Porosity | 0.170 | 0.119 |

It will be understood from Table 2 that the polyvinyl chloride produced by using the chain transfer agent of the present invention is lower in the content of the volatile matter than the polyvinyl chloride of the same degree of polymerization produced without using the chain transfer agent and has physical properties desirable for processing.

EXAMPLE 3

A polymerization was carried out in the same manner as in Example 1 except that thee amount of 2-ethylhexyl thioglycolate as a chain transfer agent was varied as shown in Table 3. The average degree of polymerization of the obtained polymers are shown in Table 3.

Table 3

| Amount of addition of the chain transfer agent (parts) | Average degree of polymerization | Polymerization yield (%) |
|---|---|---|
| 0 | 820 | 86.5 |
| 0.02 | 770 | 86.1 |
| 0.2 | 645 | 84.2 |
| 1.0 | 410 | 65.2 |
| 3.0 | 350 | 35.0 |

It will be understood from Table 3 that the alkyl thioglycolate can be effectively used in an amount of addition in a range of 0.01 to 2 parts (per 100 parts of the monomer).

EXAMPLE 4

A mixture of 1,800 parts of ion exchanged water, 7.2 parts of 2-ethylhexyl thioglycolate, 2.88 parts of hydrogen peroxide, 3.6 parts of dibutyl sulfosuccinate, 2.3 parts of sodium dihydrogen phosphate, 0.00012 part of copper sulphate and 1,200 parts of a vinyl chloride monomer was charged into a glass-lined autoclave made provided with an agitator, and the mixture was polymerized at 64°C. for 14 hours. The average degree of polymerization of the polymer was 450. For comparison, when the same polymerization was carried out without using the 2-ethylhexyl thioglycolate, the average degree of polymerization of the polymer was 810.

It is obvious even from this result that the alkyl thioglycolate is an effective chain transfer agent.

EXAMPLE 5

A polymerization was carried out in the same manner as in Example 2 except that a mixture of 1,080 parts of a vinyl chloride monomer and 120 parts of a vinyl acetate monomer was used for the monomer. As a result, a copolymer of an average degree of polymerization of 600 was obtained. Further, a polymerization was carried out in the same manner as is mentioned above except that the 2-ethylhexyl thioglycolate was not used. As a result, the average degree of polymerization of the polymer was 680.

It is obvious also from the above results that the process of the present invention is effective.

What is claimed is:

1. A process for producing vinyl chloride polymers which comprises polymerizing vinyl chloride or a monomeric mixture comprising at least 80 percent by weight of vinyl chloride and up to 20 percent by weight of an other ethylenically unsaturated monomer copolymerizable therewith at a temperature between about 50°C and about 70°C in an aqueous medium in the presence of a catalyst selected from the group consisting of an oilsoluble catalyst and a water-soluble catalyst and 0.01 to 2 parts by weight of an alkyl thioglycolate chain transfer agent of the formula:

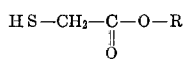

wherein R represents an alkyl group having 4 to 12 carbon atoms, per 100 parts by weight of the total monomer.

2. A process according to claim 1 wherein said alkyl thioglycolate is selected from the group consisting of n-butyl thioglycolate, n-hexyl thioglycolate, n-octyl thioglycolate, 2-ethylhexyl thioglycolate and n-dodecyl thioglycolate.

3. A process according to claim 1 wherein said ethylenically unsaturated monomer is selected from the group consisting of fatty acid vinyl esters, alkyl vinyl ethers, acrylic esters, methacrylic esters, vinylidene chloride and styrene derivatives.

4. A process according to claim 1 wherein the oil-soluble catalyst is selected from the group consisting of benzoyl peroxide, lauroyl peroxide, diisopropyl peroxydicarbonate, and azobisisobutylonitrile, and the water-soluble catalyst is selected from the group consisting of hydrogen peroxide, potassium persulfate, ammonium persulfate and a redox system of the above with an iron salt or sulfate.

* * * * *